US006608742B2

(12) United States Patent
Schweitzer, III et al.

(10) Patent No.: US 6,608,742 B2
(45) Date of Patent: Aug. 19, 2003

(54) VOLTAGE AND CURRENT SOURCE SELECTION SYSTEM FOR USE IN THE PROTECTION, AUTOMATION AND CONTROL OF AN ELECTRIC POWER SYSTEM

(75) Inventors: Edmund O. Schweitzer, III, Pullman, WA (US); Jeffrey B. Roberts, Viola, ID (US); Armando Guzman-Casillas, Pullman, WA (US); Joseph B. Mooney, Colfax, WA (US); Luther S. Anderson, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/899,961

(22) Filed: Jul. 6, 2001

(65) Prior Publication Data

US 2003/0007299 A1 Jan. 9, 2003

(51) Int. Cl.⁷ .............................................. H02H 3/00
(52) U.S. Cl. ..................................................... 361/64
(58) Field of Search .......................... 361/62–66, 76–84

(56) References Cited

U.S. PATENT DOCUMENTS 5,041,737 A * 8/1991 Schweitzer, III et al. ... 307/112
5,793,750 A * 8/1998 Schweitzer, III et al. ..... 361/64

* cited by examiner

Primary Examiner—Ronald W. Leja
(74) Attorney, Agent, or Firm—Jensen & Puntigam, P.S.

(57) ABSTRACT

The system includes a plurality of protection application elements to accomplish various power system protection functions, including for example line protection, line fault location, current direction determination, breaker protection and synchronism check, among others. The system includes local sources of current and voltage information for the protective functions as well as a receiving section for receiving such current and voltage values from a remote source, such as another protection device, as well as other necessary input information for the protective functions. A selection logic section is responsive to the output of the protective function elements, as well as the local and remote data to determine whether the primary or local sources are to be used. The outputs of the protective function elements are used by an output section to control circuit breakers and the like and are also transmitted, with the local and remote source quantities, to other protective devices.

11 Claims, 8 Drawing Sheets

VOLTAGE AND CURRENT SOURCE SELECTION SYSTEM FOR USE IN THE PROTECTION, AUTOMATION AND CONTROL OF AN ELECTRIC POWER SYSTEM

TECHNICAL FIELD

This invention relates generally to the acquisition of selected power system voltage and current values used by protective relays and similar devices for the protection and/or monitoring of electric power systems, and more particularly concerns the use of multiple voltage and current sources to supply the required voltage and current values.

BACKGROUND OF THE INVENTION

Conventionally, electric power systems are protected using function-specific protection devices, i.e. protective relays, which are responsive to voltage and current values obtained from the power line. In some cases, a specific protective device is used for only one protective function, while in other cases, a single device is capable of implementing more than one protective function. Each such specific device traditionally has associated hardware elements, including current transformers and voltage transformers (CTs and VTs) to obtain necessary current and voltage input information for the devices. The devices also include the capability of evaluating the performance of the associated CTs and VTs; in the case where one of those elements fails or becomes faulty, the device will disable the particular function/application using the quantities from the failed voltage and/or current determining elements.

Additional local voltage and current elements associated with the relay/device can provide some backup/redundancy, but this is expensive, adds complexity to the overall system and can result in a larger portion of the power system becoming disrupted if these backup elements also fail to operate.

Further, certain protection functions require voltage and current information from other stand-alone protective devices for proper operation. Obtaining these quantities requires custom wiring and programming in the individual devices, which again is expensive and also time-consuming, requiring experienced technical assistance.

DISCLOSURE OF THE INVENTION

Accordingly, the present invention is a system for selecting voltage and current sources for protective relay devices for protection and control of electric power systems, comprising: a local source for obtaining input voltage and input current quantities from a power line suitable as inputs for a local protection application; a receiving member for receiving input voltage and current quantities suitable as inputs for said local protection application from a remote protective relay device source; at least one protective application responsive to selected input voltage and current quantities from the local source or the remote source for performing a protection algorithm thereon and providing output information indicating the result thereof; a transmitter for transmitting output information from the protection application to other protective relay devices; and a selection element for selecting voltage and current input quantities from the local source or the remote source thereof, in accordance with preselected criteria.

BEST MODE FOR CARRYING OUT THE INVENTION

Figure 1:
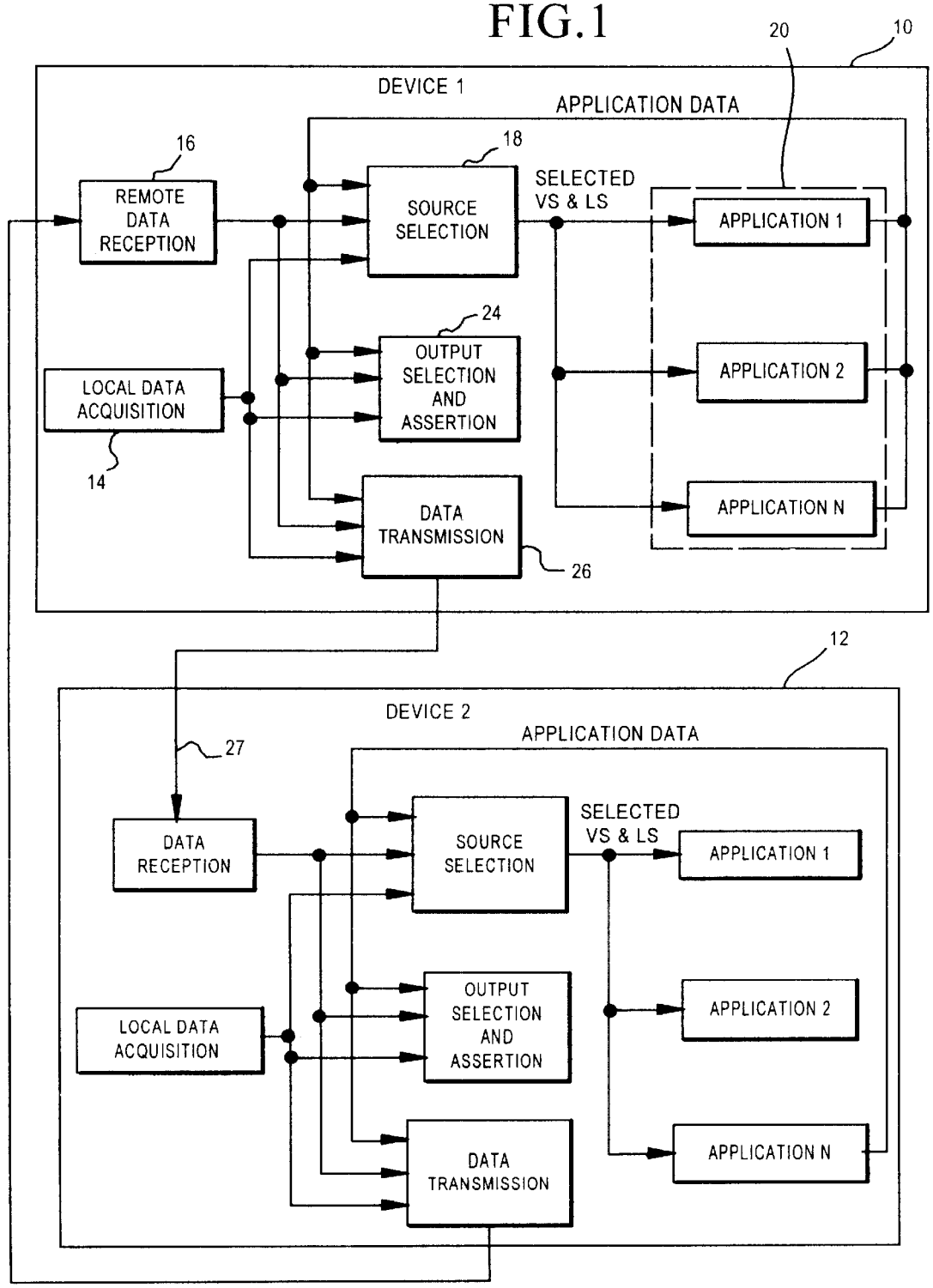
FIG. 1 is a block diagram showing the system of the present invention.

FIG. 1 is a block diagram of the system of the present invention. While the present invention can be implemented in the context of a plurality of power system protective relays or other protective devices, two protective devices 10 and 12 are shown in FIG. 1 for illustration. It should be understood, however, that the present invention, namely, a system for voltage and current source selection, can encompass a plurality of protective devices, as opposed to just two.

Each protective device, e.g. protective device 10, includes six basic operational sections. These include a local data acquisition section 14 which includes local hardware elements associated with device 10, such as conventional current transformers and voltage transformers, for acquisition of current and voltage values from the power line. Remote data reception section 16 includes a receiver for information from other protective devices, e.g. sources of power system current and voltage values from outside device 10.

In the present invention, a protective device 10 has the capability of obtaining source information, in particular power system voltages and currents, not only from its local (associated) source elements, in particular local hardware (CTs and VTs) associated with that particular device, but also has the capability of receiving such information from other protective devices and selectively choosing among them, as explained below.

The local voltage and current data from section 14 and remote data from section 16 are applied to a source selection logic circuit 18. Source selection logic circuit 18 supplies voltage and current information to the protection applications section 20, which includes the various applications carried out by protective device 10. Typically, each protection application will be implemented by specific protection algorithms. These algorithms are generally well known and are therefore not described in detail herein.

Source selection logic section 18 analyzes the local data from source 14, the remote data from source 16 and the output data from the applications section 20 and selects the appropriate input voltages and currents for each application, taking into consideration the condition of the local source elements. For instance, the source selection logic circuit 18 is capable of providing currents and voltages required for a particular application in device 10 from other sources (provided by section 16) if the local sources are determined by the relay device to be faulty, and in addition can provide selected voltage and current information needed for a particular application which is not directly available from the local source, and which would otherwise have to be obtained from other devices by custom wiring and/or processing.

Some examples of particular functional applications which protective device 10 might provide include line protection and metering, line fault location, current direction determination, breaker failure protection, bus differential protection and synchronism check. Other protective functions are also, of course, possible. The above applications are for illustration and are not exclusive. The present invention involving multiple (local and remote) sources is not limited to a device capable of carrying out multiple applications. Even a device with one functional application in section 20 can profit by the principles of the present invention.

Protective device 10 further includes an output selection and assertion section 24. This section is responsive to the output of the various applications to activate local output contacts in device 10. The outputs are used, for instance, to trip, i.e. close, local circuit breakers for protection of the power system. The output selection and assertion section 24 is responsive to the local and remote data from sources 14 and 16 in addition to the outputs from application section 20.

Protective device 10 further includes a data transmission section 26. Data transmission section 26 is responsive to the local and remote sources 14 and 16 and the outputs of application section 20 in order to rapidly and accurately transmit, such as on connecting line 27, the data provided to it to another protective device. Alternatively, it can rearrange and reroute data received from other protective devices to a third device.

As indicated above, FIG. 1 shows just two protective devices 10, 12 using the voltage and current source selection system of the present invention. However, several protective devices can be used, in such a manner so as to provide several alternative sources of voltage and current data for each protective device as well as specialized voltage and/or current quantities for particular applications which are not available from the local source elements.

Figure 2:
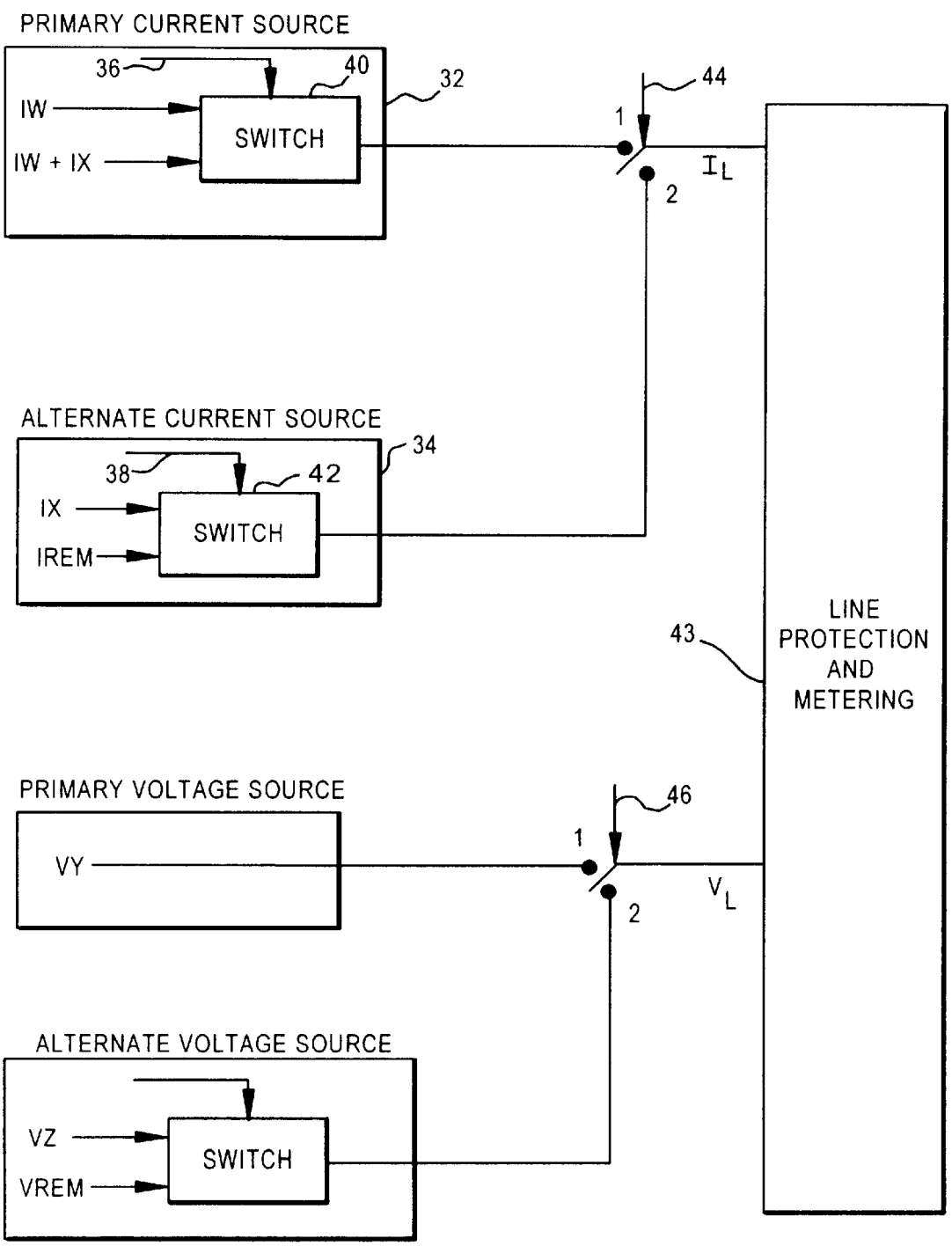
FIGS. 2–7 are block diagrams for specific protective function applications of the present invention.

FIG. 2 shows an example for one application, specifically line protection and metering, shown at 43. Line protection and metering requires line current $I_L$ and line voltage $V_L$ quantities. The $I_L$ and $V_L$ current and voltage quantities include three phases ($I_A$, $I_B$ and $I_C$; $V_A$, $V_B$ and $V_C$). $I_L$ will be supplied either by a local source 32, referred to also as a primary current source, or from a remote current source 34, also referred to as an alternate current source. In this example, the device has access to two local currents, measured by local elements from the power line, referred to as $I_W$ and $I_X$ for identification. Remote current $I_{REM}$ is available from other sources. From local source 32, either current $I_W$ or combined current $I_W+I_X$ is satisfactory as $I_L$ for the line protection and metering application. From alternative source 34, there is a choice between $I_X$ and $I_{REM}$ current values. Setting lines 36 and 38 control associated switches 40 and 42 in the primary and alternate current sources 32 and 34, respectively. The control signal 44, from a programmed logic circuit, controls whether the primary or alternate current source is to be used for $I_L$ input values. The control signal 44 usually will select the local current source 32. However, in response to information from the relay, including the local and remote data, a decision is made as to which source is best, with the alternate current source 34 being selected if a particular current ($I_{REM}$) is desirable or if the local current source has become faulty.

Primary and alternate source possibilities are also available for the line voltage $V_L$ input necessary for the line protection and metering application. The local (primary) source is $V_Y$, while the alternate source is either $V_Z$ or $V_{REM}$. The choice is made by a logic signal 46. The logic control operates in response to operational inputs to or from the relay.

Figure 3:
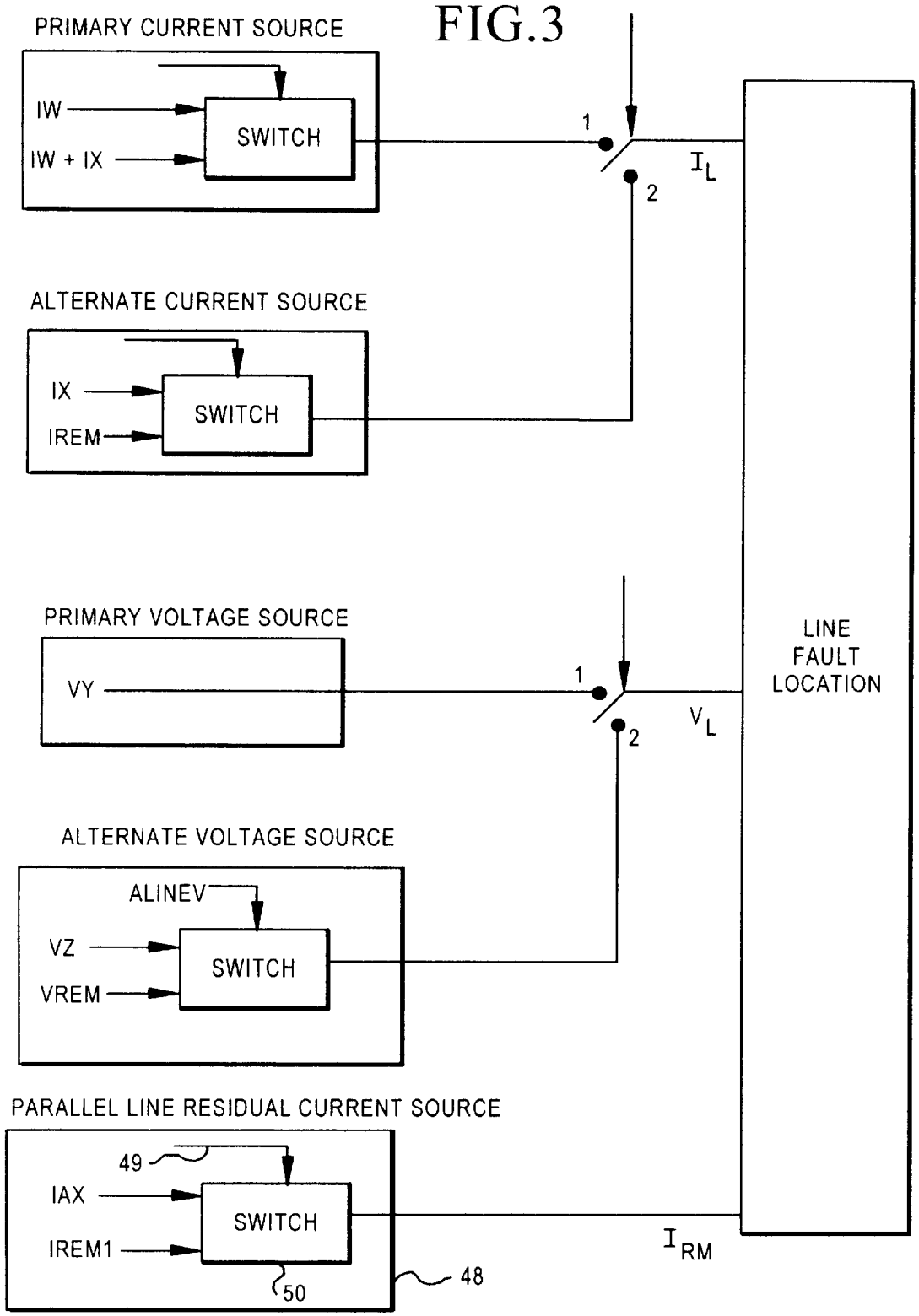

FIG. 3 shows a variation of the line protection and metering application of FIG. 2, specifically for the function of line fault location. In addition to the current and line voltages $I_L$ and $V_L$ of FIG. 2 (discussed above), fault location requires parallel-line zero sequence current information, to cover those applications having heavy zero sequence mutual coupling. This current quantity is referred to as $I_{RM}$. $I_{RM}$ is a single current input. The source of this current is shown at 48. The residual current is $I_{AX}$ or $I_{REM1}$. The choice is made through a programmed (user setting) control line 49, operating on a switch 50.

Figure 4:
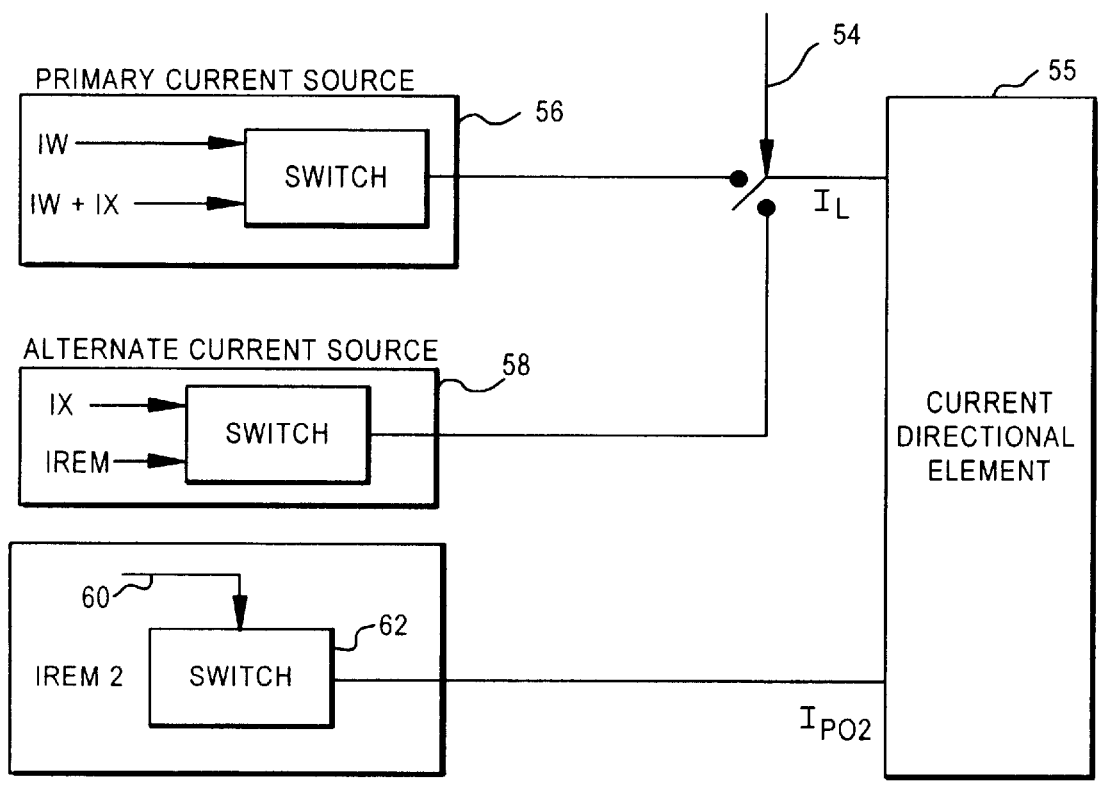

FIG. 4 shows an application for current direction determination 55. The inputs required for this application are line current $I_L$ and polarizing current $I_{POL}$. $I_L$ is a three-phase current, while $I_{POL}$ is a single current. $I_L$ can be obtained from a local (primary) source 56 or a remote (alternate) current source 58, such as shown in FIG. 2 or 3 ($I_L$ is the same current in each case). Logic control 59 determines whether the local source 56 or the alternate source 58 will be used, again depending on the operating state of the primary current sources. The polarizing current quantity $I_{POL}$ can be provided either by current $I_{BX}$ or $I_{REM2}$, selected via a control setting 60 operating through a switch 62.

Figure 5:
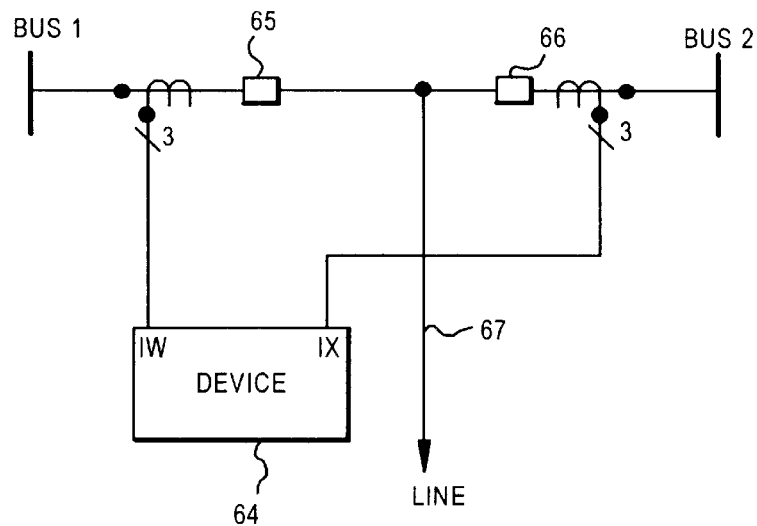
Figure 6:
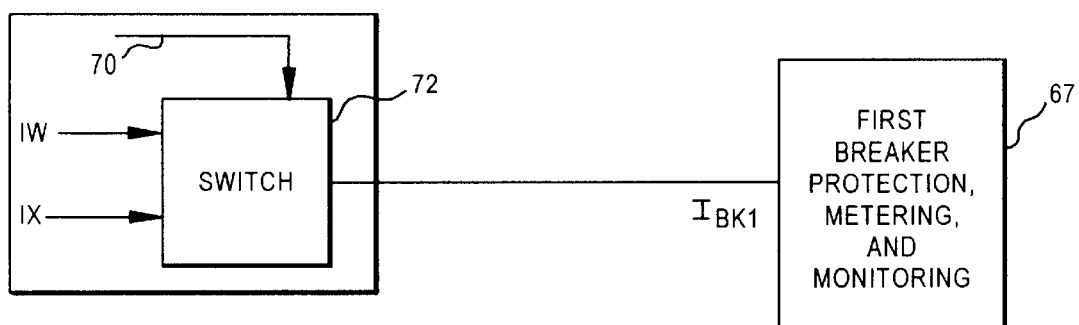
Figure 6:
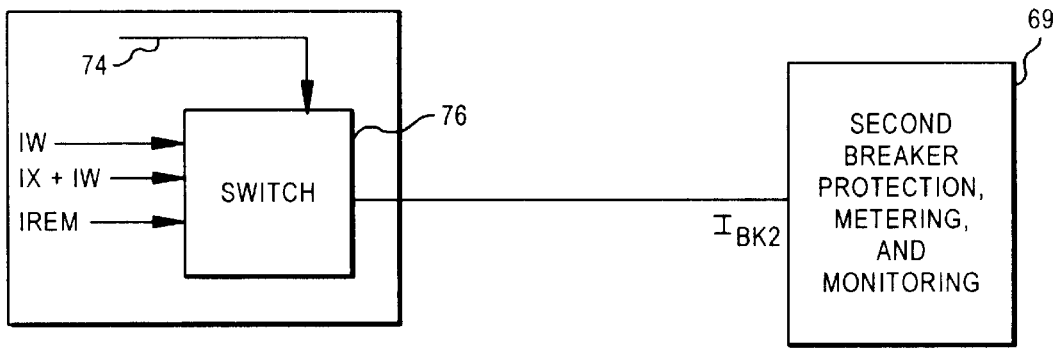

FIG. 5 shows an application for dual circuit breaker protection using a protective device 64 using current $I_W$ from a first breaker 65 and current $I_X$ from a second breaker 66, on a power line 67. FIG. 6 shows the various input current options for the dual breaker protection arrangement of FIG. 5. In order to provide protection 67 for the first breaker 65, a local current source of either $I_W$ or $I_X$ can be used for $I_{BK1}$, via a control setting 70 through switch 72. Protection 69 for the second breaker 66 is possible with any one of three different currents, $I_W$, $I_X+I_W$ or $I_{REM}$. Control setting 74 controls switch 76 to provide $I_{BK2}$ current for the protection of breaker 66.

Figure 7:
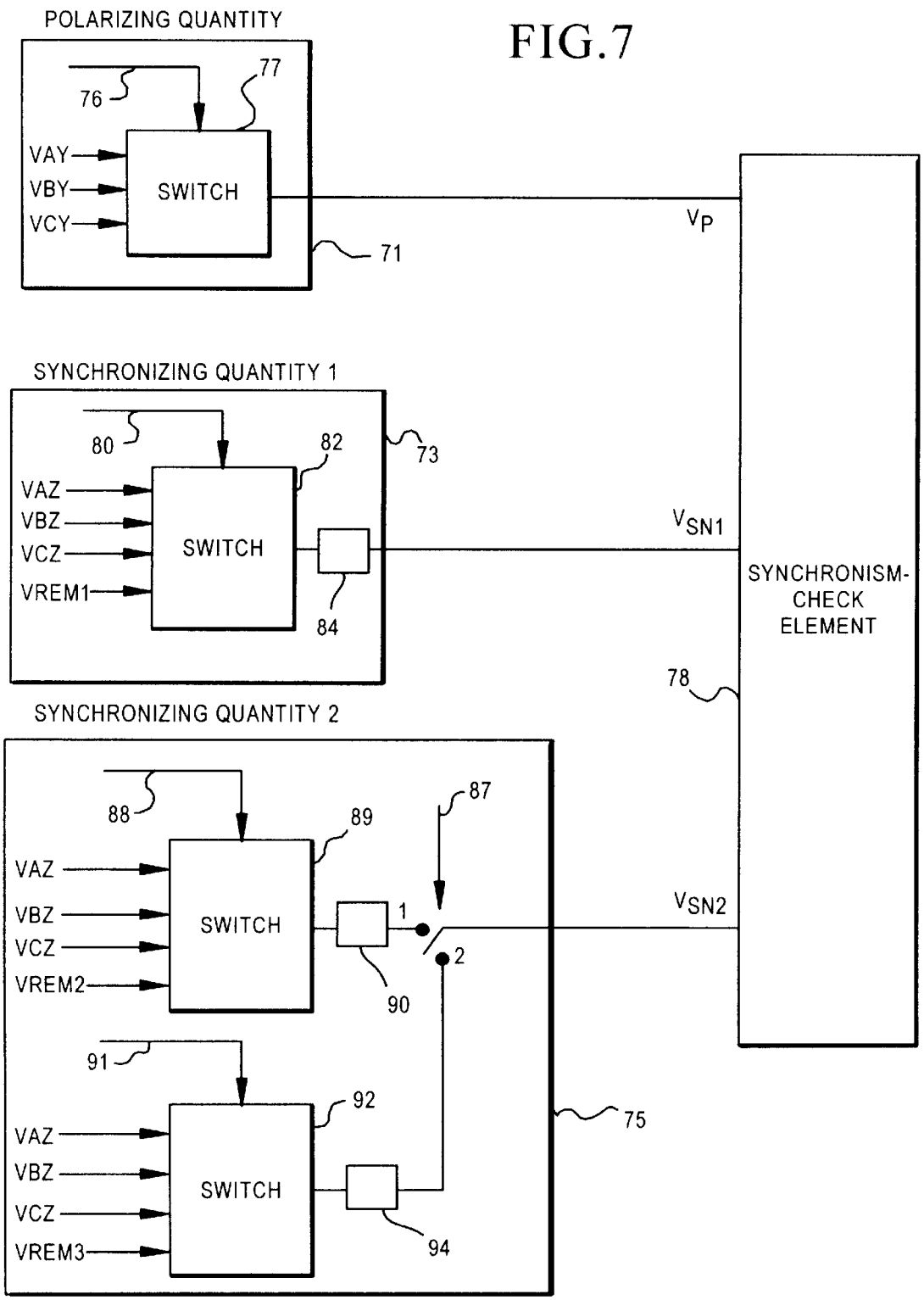

FIG. 7 illustrates a synchronism checking application 78 using the source selection principles of the present invention. Synchronism checking uses voltage information for the required polarizing $V_P$ quantity and synchronizing quantities $V_{SN1}$ and $V_{SN2}$. In multiple circuit breaker applications, synchronism check devices share common voltage applications. Typically, the required inputs to the synchronism application have different magnitudes and phase angles, requiring additional circuitry and elements to normalize the voltage inputs to the synchronism check device 78.

The voltage inputs to the synchronism check application are the polarizing voltage quantity $V_P$, a first normalized synchronizing quantity $V_{SN1}$ and a second normalized synchronizing quantity $V_{SN2}$. All of these voltage inputs to the element 70 are single voltage inputs. The polarizing quantity $V_P$, from source 71, has three local source possibilities, all line voltages, selected by a control setting 76 through an associated switch 77. The voltages are $V_{AY}$, $V_{BY}$ or $V_{CY}$. The first synchronizing quantity $V_{SN1}$, from source 73, is controlled by a control setting 80, through a switch 82. The possibilities for the synchronizing quantity are the local voltages $V_{AZ}$, $V_{BZ}$ or $V_{CZ}$ or a remote voltage $V_{REM1}$. The selected voltage from switch 82 is applied to a normalizing element 84 which compensates the magnitude and phase angle of the synchronizing voltage to the polarizing voltage $V_P$ input.

The second synchronizing voltage source 75 has a primary source and an alternate source. This is selected by logic control 87 which selects between the primary and alternate sources. Logic control 87 is a programmed variable which responds to information to or from the relay concerning the status of the primary source.

The primary source for the second synchronizing quantity $V_{SN2}$ includes local voltages $V_{AZ}$, $V_{BZ}$ or $V_{CZ}$ or a remote voltage $V_{RM2}$. The selection is made by a control setting 88 operating through a switch 89. A normalizing circuit 90 operates to provide a normalizing function to $V_{SN2}$ relative to the polarizing voltage. The alternate source uses the same local voltages, but a different remote voltage, $V_{RM3}$. A control setting 91 operates switch 92. A normalizing circuit 94 is also provided.

The above applications provide illustrations of the potential use of the source selection system of the present invention, as used in protective relay devices. Other protection applications are possible, using other primary and alternate current and voltage source arrangements.

Figure 8:
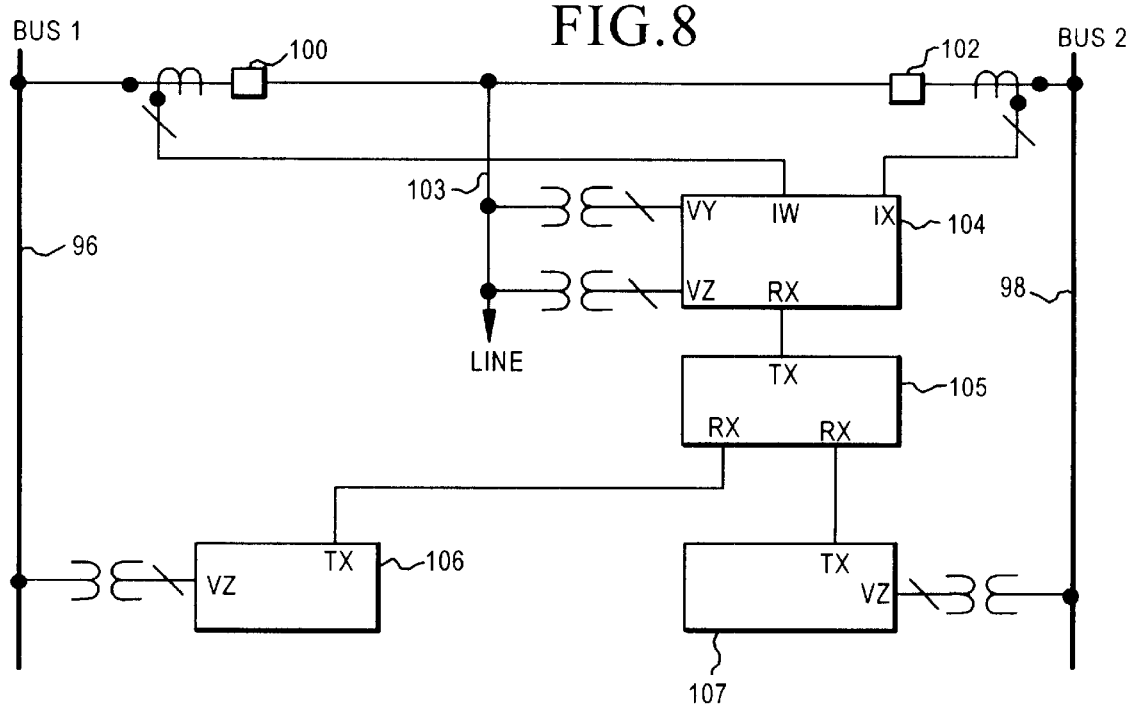
FIGS. 8–11 are block diagrams showing use of the principles of the present invention with combinations of functional applications.

Individual protection applications can also be combined in various ways to provide multiple function applications in the same device, using the source selection principles of the present invention. FIG. 8 shows such a combined application which provides line protection, dual breaker protection and dual breaker synchronization. This application involves first and second bus lines 96 and 98, first and second circuit breakers 100 and 102, and power line 103. The system uses four protective devices (relays) 104–107. Current $I_W$ from breaker 100 and current $I_X$ from breaker 102 are two current inputs to protective device 104. Device 104 uses $I_W$ for the protection of breaker 100, $I_X$ for protection of breaker 102 and $I_W+I_X$ for protection of line 103. Protective device 104 also uses $V_Y$ (primary voltage) and $V_Z$ (alternate voltage) for power line protection. Device 104 also provides the synchronism check for breakers 100 and 102. Device 104 also uses a local voltage $V_{BY}$ (not shown) as a polarizing voltage and the remote voltages from buses 96 and 98 through its receive section $R_X$ as synchronizing voltages.

Protective device 106 acquires a synchronizing voltage from bus 96 and transmits this voltage by a transmit section to a receive section $R_X$ in device 105. Protective device 107 acquires a synchronizing voltage from bus 98 and transmits this voltage by transmit section $T_X$ to a receive section $R_X$ in protective device 105. Protective device 105 receives the routed synchronizing signals from protection devices 106 and 107 and transmits these signals to the receive section $R_X$ in protective device 104. In the arrangement of FIG. 8, protective device 105 thus operates as a routing unit relative to the functions performed by device 104.

Figure 9:
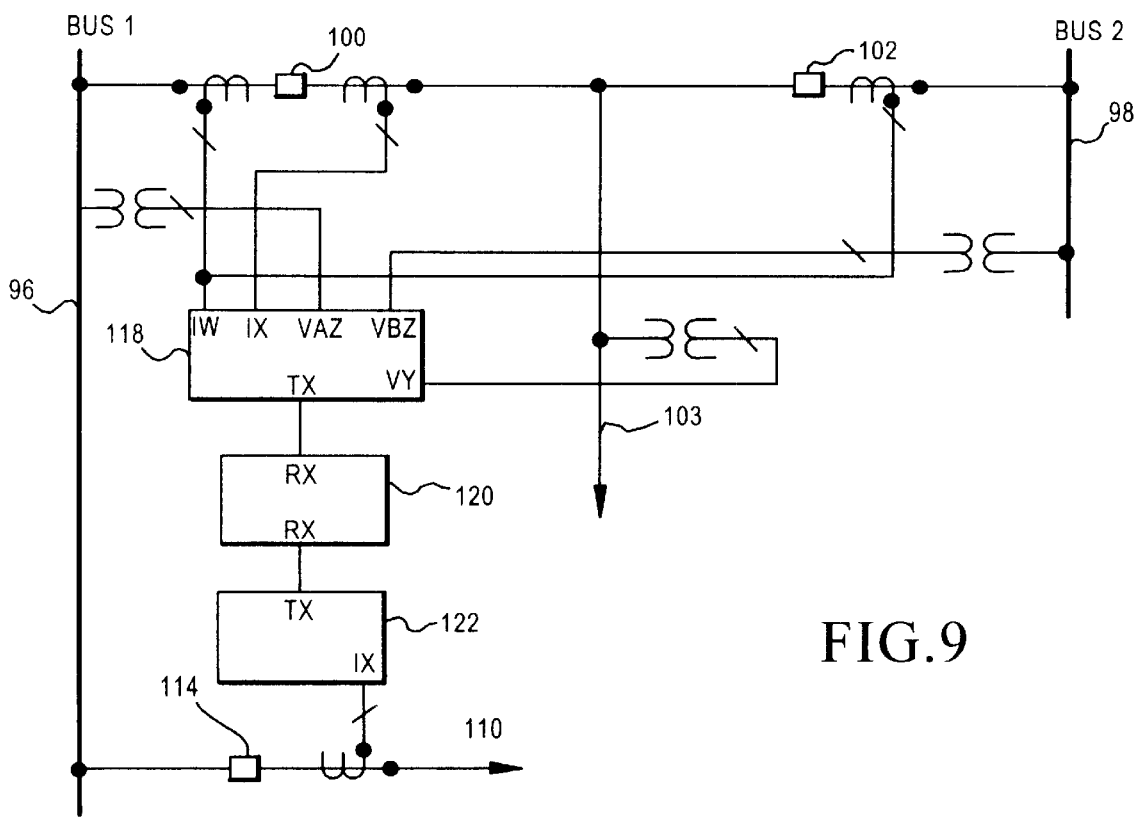

FIG. 9 shows a dual-breaker protection and synchronization with line protection and bus protection combined application. The bus and breaker arrangement is the same as in FIG. 8 (having the same numerals) with an additional line 110 and an additional breaker 114. The currents from breakers 100 and 102 are combined and shown as $I_W$ to device 118 for line protection. Breaker 100 also provides current $I_X$ for breaker 100 protection and bus 96 protection. Protective device 118 adds currents $I_W$, $I_X$ to provide protection for breaker 102. Protective device 118 uses line voltage $V_Y$ for line protection. Protective device 118 also provides breakers 100, 102 with a synchronism check, with a local voltage $V_Y$ being the polarizing voltage, local voltage $V_{AZ}$ being the first synchronizing voltage, and local voltage $V_{BZ}$ being the second synchronizing voltage. Protective device 118 transmits current $I_X$ to protective device 120 for protection of bus 96. Protective device 122 measures current $I_X$ on line 110 and transmits that current to protective device 120. Protective device 120 uses currents from protective devices 118 and 122 in its bus protection algorithm.

Figure 10:
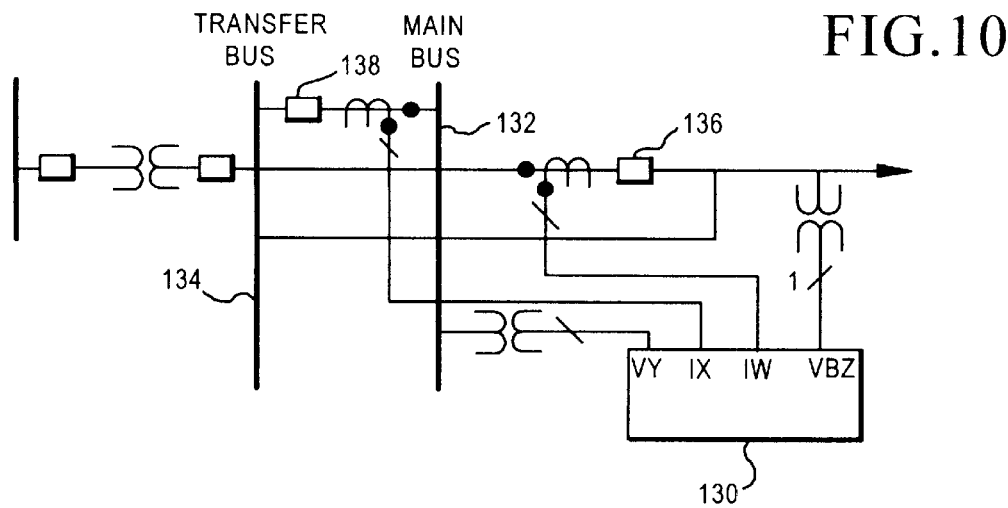

FIG. 10 shows a multiple function application for line and breaker protection. The application uses a single protective device 130, with a main bus 132 and a transfer bus 134. Breaker 136 is the line breaker and breaker 138 is the bus tie breaker. Protective device 130 uses current $I_W$ from breaker 136 as the primary current for line and breaker protection. When breaker 136 is out of service, the protective device 130 uses current $-I_X$ from breaker 138 as an alternate current source for line and breaker protection. Hence, there is no need for a dedicated protective relay for breaker 138. Protective device 130 uses the main bus voltage $V_Y$ for line protection. It also uses $V_Y$, another voltage from the main bus, and $V_{BZ}$ (line voltage) for breaker synchronism check.

Figure 11:
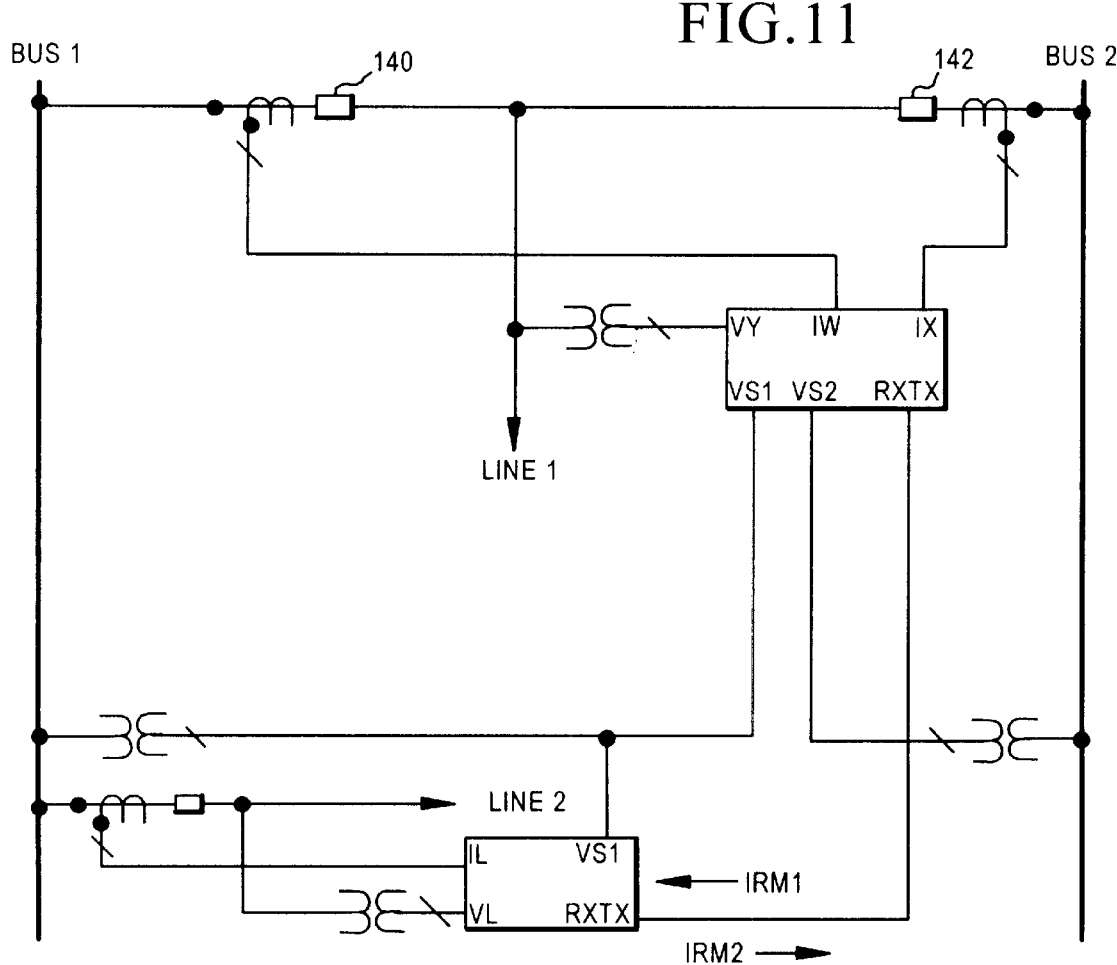

FIG. 11 shows a combined function for dual breaker protection and synchronization and line protection. The bus arrangement is identical to that of FIG. 9. Separate breaker failure protection is provided for circuit breakers 140 and 142. Line protection is also provided, as well as synchronization. This arrangement, using the source selection capability of the present invention, provides the desired protection with fewer protective devices and fewer current transformers than necessary for conventional arrangements.

Hence, a system has been disclosed which is directed toward source selection capability for protective devices used in power systems. Alternative sources can use other protective devices which will provide replacement voltages and currents for local values if the local elements are faulty. Specialized current and voltage values can also be provided as part of the system, eliminating the need for custom wiring and programming.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for selecting voltage and current sources for a protective relay device for protection and control of electric power systems, comprising:

a local source for obtaining input voltage and input current quantities from a power line suitable as inputs for a local protection application section in the protective relay device;

a receiving member for receiving input voltage and current quantities suitable as inputs for said local protection application section from a remote protective relay device;

at least one local protection application section in the protective relay device responsive to selected input voltage and input current quantities from the local source or the remote source for performing a protection algorithm thereon and providing output information indicating the result thereof;

a transmitter for transmitting output information from the local protection application section to other protective relay devices; and a selection element for automatically selecting voltage and current input quantities from the local source or the remote source, in accordance with preselected power system criteria.

2. A system of claim 1, wherein the preselected criteria includes the condition that the local source is faulty.

3. A system of claim 1, including a plurality of protection application sections within the protective relay device.

4. A system of claim 1, wherein the source selection is based on the output of the protection application sections within the protective relay device and from the local and remote sources of data.

5. A system of claim 1, wherein the transmitted data includes local source data, remote source data received from other protective relay devices, and output information from the protection application sections in the protection device.

6. A system of claim 1, including an output section for providing control signals to other devices, including circuit breakers, the output section being responsive to the output information from the protection application sections and the local and remote sources of data.

7. A system of claim 1, wherein the source selection element is responsive to data from the protective device, the protection application section and the local and remote data sources.

8. A system of claim 1, wherein the protection application sections include: local line protection and metering, line fault location, current direction determination, breaker failure protection metering and monitoring, and synchronism check.

9. A system of claim 1, wherein the protection application sections include at least the following multiple function protection application: dual breaker protection, synchronization and line protection.

10. A system of claim 1, wherein the protection application sections include at least the following multiple function protection application: dual breaker protection and synchronization, line protection and bus protection.

11. A system of claim 1, wherein the protection application sections include at least the following multiple function protection application: line and breaker protection.

* * * * *